Sept. 5, 1961      R. I. MEYERS      2,998,945
FORCE SENSING DISCONNECT SYSTEM
Filed April 21, 1958
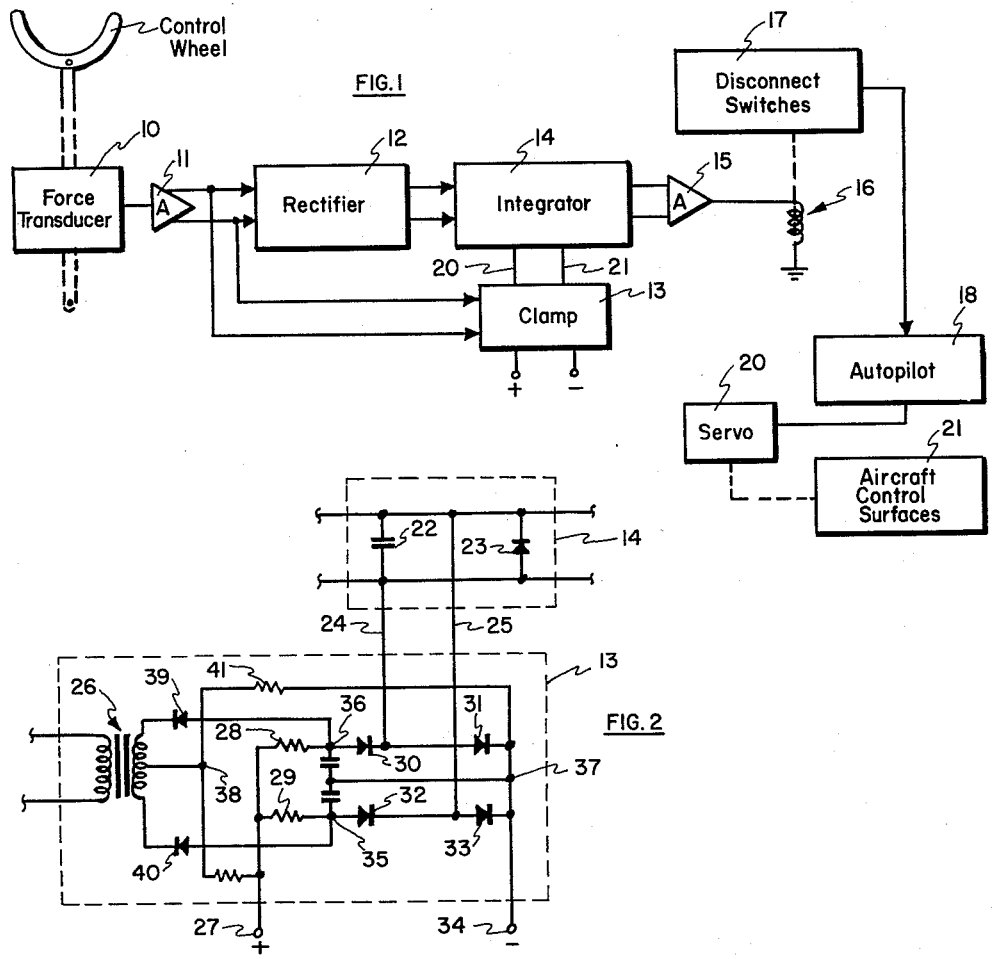
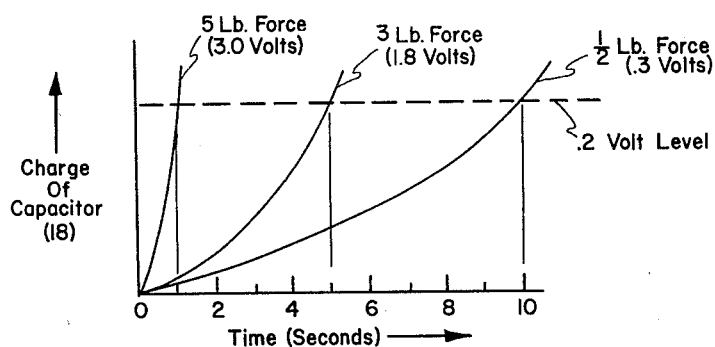
*INVENTOR.*
RAYMOND I. MEYERS United States Patent Office 2,998,945
Patented Sept. 5, 1961

2,998,945
FORCE SENSING DISCONNECT SYSTEM
Raymond I. Meyers, Rockford, Mich., assignor to Lear, Incorporated
Filed Apr. 21, 1958, Ser. No. 729,719
4 Claims. (Cl. 244—77)

This invention relates to a force sensing switch device and, more particularly, to a force sensing switch device for an automatic to manual disconnect system.

In an airplane having an automatic control system, there is the problem of switching from automatic control to manual control. It is desired to have a system whereby a pilot can place his hands on the control wheel and follow the movement of the automatic control without disconnecting the automatic control, but may disconnect the automatic control by applying pressure to the control wheel.

The present and obvious method is to provide mechanization which will actuate a set of contacts to switch off the automatic control at a given force level. The disadvantage of this method is that a force level which is satisfactory for speed and ease of switching is usually so low that inadvertent switching often occurs. Hence, it is difficult to arrive at a force level which is low enough to allow smooth disengagement of the automatic controls and yet not result in inadvertent disconnect due to the pilot carrying his hand on the control wheel.

Therefore, it is an object of this invention to overcome the aforementioned objection and others.

It is another object of this invention to provide a force sensitive switch which integrates the force signal with respect to time.

Still another object of this invention is to provide a force sensitive switch that will operate after a predetermined time when a constant small force is applied to the force sensor and will operate almost instantaneously when a relatively large force is applied to the force sensor.

These and other objects will become apparent from the detailed description below taken in conjunction with the drawing in which:

FIG. 1 is a block diagram of the preferred embodiment;

FIG. 2 is a schematic illustration of a typical integrator and clamp; and

FIG. 3 is a set of waveforms illustrating the time required to operate the disconnect switch for different forces applied to the control wheel.

Referring now to FIG. 1, the force transducer 10 is operably associated with the control wheel and emits an A.C. electrical signal proportional to the force applied on the control wheel. Force transducer 10 may be of the type shown and described in U.S. Patent Number 2,408,770, issued October 8, 1946, to C. A. Frische et al. and assigned to Sperry Gyroscope Company, Incorporated. An amplifier 11 is electrically connected to the force transducer 10 so that any signal emitted by the force transducer 10 is amplified by amplifier 11. A rectifier 12 and a clamp 13 are electrically connected to the amplifier 11 such that any electrical signal emitted by amplifier 11 is transmitted to the rectifier 12 and clamp 13. An integrator 14 is operably connected to rectifier 12 and a clamp 13 such that a D.C. current emitted by rectifier 12 is integrated by integrator 14. Clamp 13 is connected to integrator 14 such that when clamp 13 is in a de-energized state, the output of integrator 14 is effectively short circuited and, therefore, can emit no electrical signal. Amplifier 15 is electrically connected to integrator 14 and receives and amplifies signals from integrator 14. Relay switch 16 is electrically connected to and responsive to signals emitted by amplifier 15. The disconnect switches 17 are mechanically connected to and operated by the relay switch 16.

An autopilot 18 is connected and responsive to the disconnect switches 17. A servo 20 is responsive to signals from autopilot 18. The aircraft control surfaces 21 are mechanically linked to the control wheel by way of servo 20.

Reference is made now to FIG. 2 which is a schematic drawing of a typical integrator and typical clamp. The capacitor 22 of integrator 14 is connected across the inputs to integrator 14. A limiting diode 23 is connected across the output of integrator 14 and the leads 24 and 25 from the clamp 13 are also connected across the input and output of integrator 14. The limiting diode 23 may be of the double-headed Zener diode type commonly used to protect an amplifier from damaging voltages. The double-headed diode conducts in both directions when a set voltage is exceeded. In the circuit in FIG. 2, the limiting diode 23 conducts when a set voltage is exceeded, thereby passing current across the output lines of integrator 14 and protecting the amplifier 15 from excessive voltages. The clamp 13 is biased such that when the transformer 26 is not energized, then the current flow is from the positive terminal 27 through the resistors 28 and 29 and through the diodes 30, 31, 32 and 33 to the negative terminal 34. As long as the potential at points 35 and 36 is more positive than potential at point 37, then current will flow in the pattern described above. It can be seen, here, that any potential across the capacitor 22 will be shorted out while current is passing through diodes 30 and 32 due to the connecting lines 24 and 25. Note, also, that the diodes 39 and 40 are back biased because of the positive potential at point 38. If, however, the transformer 26 is conducting with at least twice the voltage as the bias voltage at point 27, then the diodes 39 and 40 conduct, making point 38 negative potential. At the same time, the diodes 39 and 40 conducting cause the points 35 and 36 to be negative potential, because point 38 is negative—hence, diodes 30, 31, 32 and 33 are back biased and in a non-conducting state. It can be seen then that the current, if of sufficient voltage, passes through the transformer, through diodes 39 and 40 to point 38 and point 27. With the diodes 30, 31, 32 and 33 in a non-conducting state, the circuit is open between lines 24 and 25 and, hence, any signal entering the integrator 14 passes to the amplifier 15 after the capacitor 22 has charged.

In operation, the force transducer 10 converts any force applied to the control wheel into an electrical signal which is sent to amplifier 11. After the signal has been amplified by amplifier 11, it is transmitted to rectifier 12 and clamp 13. The clamp 13 is biased such that only at the desired force level or higher level will the signal from amplifier 11 be sufficient to energize the clamp. When the signal from amplifier 11 is not high enough to energize the clamp 13, then the signal from rectifier 12 enters integrator 14 and effectively "sees" a short circuit as described above and integrator 14 produces no output signals. If, however, the signal from amplifier 11 is of sufficient value to cause clamp 13 to be energized, then the signals entering the integrator 14 from rectifier 12 are passed on to amplifier 15 and then to the relay switch 16 which actuates the disconnect switches 17, disconnecting the autopilot 18. The signal entering the integrator 14 from rectifier 12, when the clamp 13 is energized, charges the capacitor 22. It can be seen then that if the relay switch 16 required a certain voltage to actuate, then there is a time delay caused by the charge of capacitor 22 before the relay switch 16 will actuate.

FIG. 3 shows the time it takes a typical capacitor to charge to a .2 volt level.

The time delay is dependent upon the voltage required by the relay switch 16 and the signal received into the integrator 14 from the force transducer 10 through amplifier 11 and rectifier 12. For example, if the relay switch 16 required a .2 volt signal to actuate and a ½ lb. pressure on the control wheel causes a .3 volt signal to enter the rectifier 12 and clamp 13, then the current charging the capacitor 18 will take time, for example 10 seconds, to charge the capacitor to the .2 volt level.

In the above case, the clamp would be set to energize at approximately a .19 volt level. Consider now a 5 lb. pressure on the control wheel. This will cause a 3 volt signal to enter the rectifier 12 and clamp 13, causing the clamp 13 to energize and the capacitor 18 will be charged to the .2 volt level in only one second.

If now the force applied to the wheel is reduced, then the current to the clamp is lowered and if lowered enough, causes the clamp to de-energize which, in turn, causes the integrator to be effectively short circuited and, therefore, no current is passed to the relay switch 16 and the relay switch, in turn, causes the autopilot to be re-engaged.

It can be seen that the pilot can place his hands on the control wheel and inadvertently apply a small pressure for a short time without disconnecting the autopilot; whereas if the pilot desired to disconnect the autopilot, he merely holds the pressure on the stick for a longer time or applies a larger force which disconnects the autopilot almost instantaneously.

It is to be noted that it is possible to set up the disconnect switches 17 when the pilot moves the control wheel along a single axis, e.g., the pitch axis, only the pitch axis commands from the autopilot 18 are disconnected.

The arrangement of the disconnect switches 17 determine whether the autopilot 18 will be completely disconnected allowing the pilot to take over manual control of the aircraft or only one phase or channel of the autopilot 18 will be disconnected allowing new commands to be fed to the autopilot 18 for that particular phase or channel.

Although the present invention has been described with a certain degree of particularity, it is understood that various modifications in the details and arrangements of parts may be had without departing from the spirit and scope of the invention as hereinafter claimed.

I claim:

1. In a manned vehicle, a control wheel force sensing switch system comprising means for sensing force applied to said control wheel, said means capable of emitting an electrical signal proportional to the force applied to said control wheel, an integrator connected and responsive to said electrical signal and having an electrical output proportional to said electrical signal from said sensing means, means electrically connected to said electrical output for prohibiting said output below a predetermined level from said integrator, and a relay switch connected and responsive to signals from said integrator.

2. In a manned vehicle utilizing an autopilot and a manual control, a force sensing switch system comprising means for sensing force applied to said control wheel, said means capable of emitting an electrical signal proportional to the force applied to said control wheel, a rectifier and an electrical clamp connected and responsive to signals from said sensing means, an integrator connected to said rectifier, said electrical clamp being connected across the output of said integrator such that said clamp is capable of restricting an output of said integrator and a relay switch connected and responsive to signals from said integrator for engaging and disengaging said autopilot.

3. The device as claimed in claim 2 wherein said integrator comprises a capacitor and a limiting diode.

4. In a manned aircraft, a force sensing switch system comprising a control wheel, a force transducer connected to said control wheel to transpose force applied to said wheel to electrical signals proportional to the force applied to said wheel, means for amplifying said electrical signals, a rectifier and a clamp connected and responsive to electrical signals from said amplifier means, an integrator connected to said rectifier and said clamp for integrating electrical signals from said rectifier, said clamp being biased to a given electrical value such that said clamp effectively short circuits said integrator except when the electrical signals from said amplifier to said clamp are sufficient to overcome the bias on said clamp, a second amplifier means connected to receive electrical signals from said integrator when said integrator is not effectively short circuited by said clamp, and a relay switch responsive to signals from said second amplifier.

References Cited in the file of this patent
UNITED STATES PATENTS

| | | |
|---|---|---|
| 2,673,314 | MacCallum | Mar. 23, 1954 |
| 2,861,756 | Feucht et al. | Nov. 25, 1958 |